United States Patent [19]

Barou et al.

[11] 4,125,998
[45] Nov. 21, 1978

[54] DEVICE FOR IGNITING FUEL INJECTED INTO A RAPIDLY FLOWING GASEOUS MEDIUM

[75] Inventors: Ernest J. Barou, Le Mee sur Seine; Roland Beyler, Levallois-Perret; Marc F. B. Buisson, Le Mee sur Seine; Jacques E. J. Caruel, Dammarie les Lys; Roger A. J. Vandenbroucke, Antony, all of France

[73] Assignee: Societe Nationale et de Construction de Moteurs d'Aviation, Paris, France

[21] Appl. No.: 794,242

[22] Filed: May 5, 1977

[30] Foreign Application Priority Data

May 13, 1976 [FR] France .................................. 76 14364

[51] Int. Cl.² .............................. F02C 7/22; F02K 3/10
[52] U.S. Cl. ...................................... 60/261; 60/39.71; 60/39.72 R; 60/39.82 P; 431/349
[58] Field of Search .................... 60/39.72 R, 39.82 P, 60/39.71, 261; 431/349

[56] References Cited

U.S. PATENT DOCUMENTS

| | | | |
|---|---|---|---|
| 3,085,401 | 4/1963 | LeFebvre et al. | 60/39.72 R |
| 3,540,216 | 11/1970 | Quillevere et al. | 60/39.72 R |
| 3,765,178 | 10/1973 | Hufnagel et al. | 60/39.72 R |
| 3,800,527 | 4/1974 | Marshall et al. | 60/39.72 R |
| 3,931,707 | 1/1976 | Vdoviak | 60/39.72 R |

Primary Examiner—Robert E. Garrett
Attorney, Agent, or Firm—Bacon & Thomas

[57] ABSTRACT

An auxiliary chamber or ignition "prechamber" for afterburners of aeronautical turbine engines draws in, through a perforated plate, a carbureted mixture produced by fuel projected against an anvil by an injection manifold, and the injection manifold also issues a jet of fuel into a tube which discharges into the chamber downstream of a spark plug. The produced flame is guided into a flame stabilizer.

3 Claims, 5 Drawing Figures

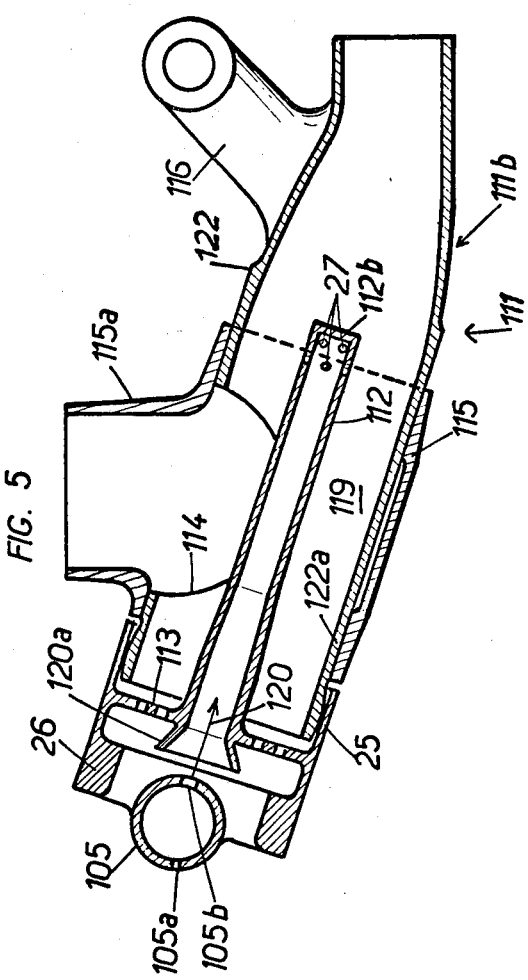
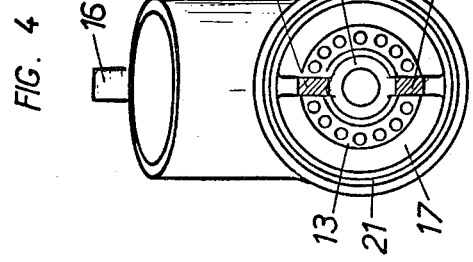

DEVICE FOR IGNITING FUEL INJECTED INTO A RAPIDLY FLOWING GASEOUS MEDIUM

BACKGROUND OF THE INVENTION

This invention pertains to a device for igniting fuel injected into a rapidly flowing gaseous comburent medium. It is particularly applicable to ignition of reheaters (or afterburners) of aircraft turbojet engines, but it may also be applied to the ignition of ramjet engines, for example.

Aircraft turbojet reheaters are normally ignited by means of an injection of fuel during a limited interval, upstream of at least the last stages of the turbojet turbine. Since the pressure and temperature are very high at this point, the fuel ignites spontaneously and produces a local overheating of the gases, leading to ignition of the carbureted reheating mixture. This mode of ignition, known in the art by the English expression "hot streak", involves risks, since the failure of an injection valve or rupture of a feed line results in a prolonged discharge of fuel through the turbine, leading to its destruction.

Moreover, when the reheater is used during take-off, it is desirable to be able to ignite it before the aircraft starts to roll on the ground, so as to ensure that it will be ignited upon take-off. To this end, one must be able to ignite the reheater while the turbojet engine is operating at partial load, because the aircraft's brakes are incapable of holding it fast while the turbojet is operating at full power and the afterburner is also on. Since it is impossible to ignite the reheater of a turbojet engine operating at partial load by means of the "hot streak" method, it has been proposed to inject ignition fuel into a small auxiliary chamber, known as the ignition "prechamber", so as to form within it a carbureted mixture of a richness suitable to ensure that it will be ignited by an ignition element such as a spark plug. As the auxiliary chamber ejects the burning gases near a flame stabilizer located in the after burner channel downstream of an injection of reheating fuel, into a region where the richness of the carbureted mixture is sufficient, the combustion propagates through the entire channel.

In such "prechamber"-equipped devices, it has been sougt to obtain an intimate mixture of the ignition fuel with the comburent air by directing the fuel onto a grid or perforated plate. Such an arrngement does not permit igniting the reheater under a very fast flow of gas. It has been observed, for example, that ignition does not take place if the Mach number of the gas in the afterburner channel reaches 0.40 at an "afterburner overall richness" (ratio of the weight rate of flow of the fuel injected into the afterburner channel to the weight rate of flow of the air contained in the gas current flowing in that channel) of 0.003 to 0.004. Examples of prior devices seeking to achieve more reliable afterburner ignition are the devices described in U.S. Pat. No. 2,920,445 and French Pat. No. 1,207,017.

SUMMARY OF THE INVENTION

One of the purposes of the invention is to provide a "prechamber" which will ensure the ignition of fuel injected into a very fast gas flow.

Another purpose is to provide a "prechamber" provided with an ignition spark plug and fixed to a flame stabilizer located in an aferburner channel downstream of a fuel injection valve, in such a manner that the said flame stabilizer, injection valve and spark plug can expand differentially without constraint.

Yet another purpose is to provide an ignition "prechamber" which receives a fuel jet issued in the downstream direction by an injection manifold and arranged in such a fashion that the fuel jet will always be centered within the said "prechamber".

In accordance with the present invention, the auxiliary chamber or ignition "prechamber", which comprises, in a known fashion, an enclosure located in the gas flow and equipped with an ignition element such as a spark plug, receives, through an intake grid or perforated plate, a carbureted mixture which is ignited within the said enclosure by the said element, and comprises in addition a tubular conduit which receives through its upstream extremity a fuel jet which it discharges, together with the gases drawn by the said upstream extremity from the said flow, into the said enclosure downstream of the said ignition element. The carbureted mixture preferably has a richness just sufficient to allow it to be ignited in the enclosure, and the fuel jet has a rate of flow such that it forms a richer mixture with the air contained in the gas drawn in by the tubular conduit.

As a result of this arrangement, a fuel injected into the gaseous flow is ignited even if that flow is very fast. Although the invention is in no way founded upon any specific scientific hypothesis, one may attempt to explain this advantageous effect in the following manner: since the fuel jet is enclosed by the tubular conduit as far as downstream of the ignition element, it does not present the risk of enriching the carbureted mixture fed in through the grid or perforated plate, so that the mixture is ignited by the said element and produces a flame around the richer mixture which is discharged from the tubular conduit and which, leaving the enclosure, propagates the combustion to the fuel injected into the gaseous flow, even if the flow is sufficiently fast to have a tendency to confine the said flame within the enclosure.

The enclosure is advantageously formed by a casing of generally tubular form which surrounds the tubular conduit and whose exit opening faces a flame stabilizer located in the gaseous flow downstream of an injection manifold which projects fuel onto an anvil located farther upstream, the entrance opening of the said casing facing the said manifold so as to draw in a portion of the carbureted mixture produced by the atomization of the fuel on the anvil, and the said manifold being provided with an aperture which issues a jet of fuel downstream into the tubular conduit.

In one mode of achievement, the downstream end of the casing is linked to the flame stabilizer and its upstream end is connected to the injection manifold by means of a swivel joint capable of sliding parallel to the axis of the casing, while the ignition element is fixed to the wall of the conduit which channels the gaseous flow and is connected, by means of a swivel joint capable of sliding parallel to the axis of the said element, to a sleeve installed so as to slide on the casing. Due to this arrangement, the differential expansions of the various components are absorbed without constraining the casing and the entrance opening of the tubular conduit is maintained opposite the downstream aperture of the injection manifold.

BRIEF DESCRIPTION OF THE DRAWINGS

The following description when read with reference to the attached drawings, which are presented as nonlimiting illustrative examples, will show the advantages of the invention and of the art of achieving it; all specific characteristics which derive from either the figures or the text are understood to be included in the scope of the invention.

FIG. 4 is a transverse cross section along line IV—IV of FIG. 3; and

FIG. 5 is a partial view similar to FIG. 3, illustrating another embodiment.

DESCRIPTION OF THE PREFERRED EMBODIMENTS

Figure 1:
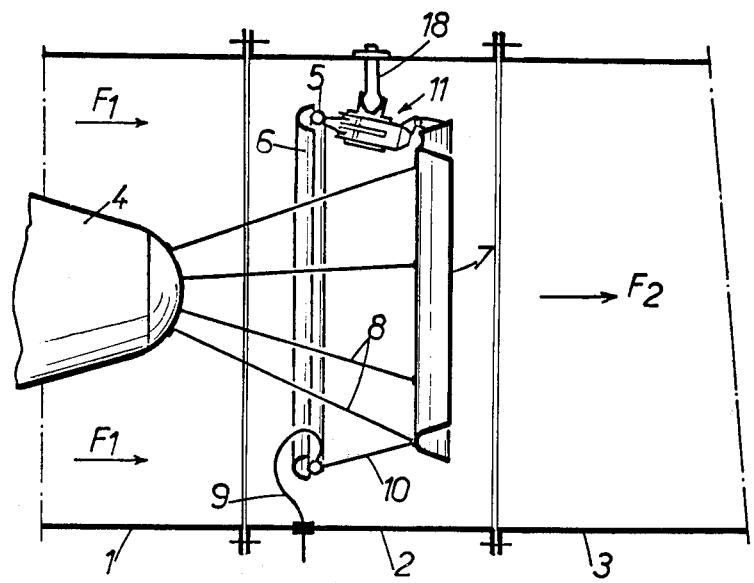
FIG. 1 is a schematic longitudinal cross section of an afterburner channel provided with an ignition device according to the invention.

FIG. 1 shows schematically a portion of the afterburner channel of an aircraft turbojet engine. 1, 2 and 3 are three segments of the channel wall, and 4 is a portion of the central cone which supports the rear bearing (not shown) of the engine's low-pressure turbine. The afterburner channel receives a flow of hot gases coming from the turbine (not shown) and flowing in the direction of the arrows F1. These gases, which may be reheated in the channel by means of the combustion of an afterburning fuel injected by a manifold 5, leave the channel according to arrow F2 and are ejected through a nozzle (not shown). The injection manifold 5 is a circular conduit coaxial with the channel and is provided on its upstream side with adjutages or nozzle orifices 5a (FIGS. 2 and 3) through which it can inject fuel which atomizes on a ring-shaped anvil 6 located farther upstream. This anvil 6 has a cross section of general U shape with arms facing downstream; its shape is depicted in FIG. 3.

Downstream of the injection manifold 5 is located a flame stabilizer 7 consisting of a ring having a section shaped as a V rounded at the top whose arms face downstream. This ring 7 is fixed to the central cone 4 in a well-known fashion, by means of an arrangement of hinged struts shown schematically as 8. The injection manifold 5 is fed with fuel by a tubing containing a "swan-neck" portion 9 which goes through the wall segment 2 of the channel and is connected on the outside of the said channel to a source of pressurized fuel (not shown). The ring 7 supports the injection manifold 5 by means of hinged struts such as 10, and the manifold 5 itself supports the anvil 6 by means of other hinged struts (not shown). This mode of securing, which is described in detail in French Pat. No. 71.01683 (Publication No. 2,122,308), allows differential thermal expansion of the channel wall and the ring-shaped components 5, 6 and 7 while maintaining them coaxial with the channel.

Figure 2:
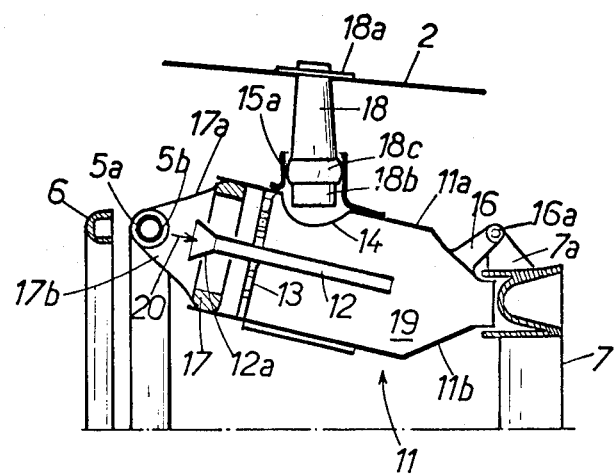
FIG. 2 is a partial view, similar to FIG. 1 but on a larger scale, depicting schematically the injection device.
Figure 3:
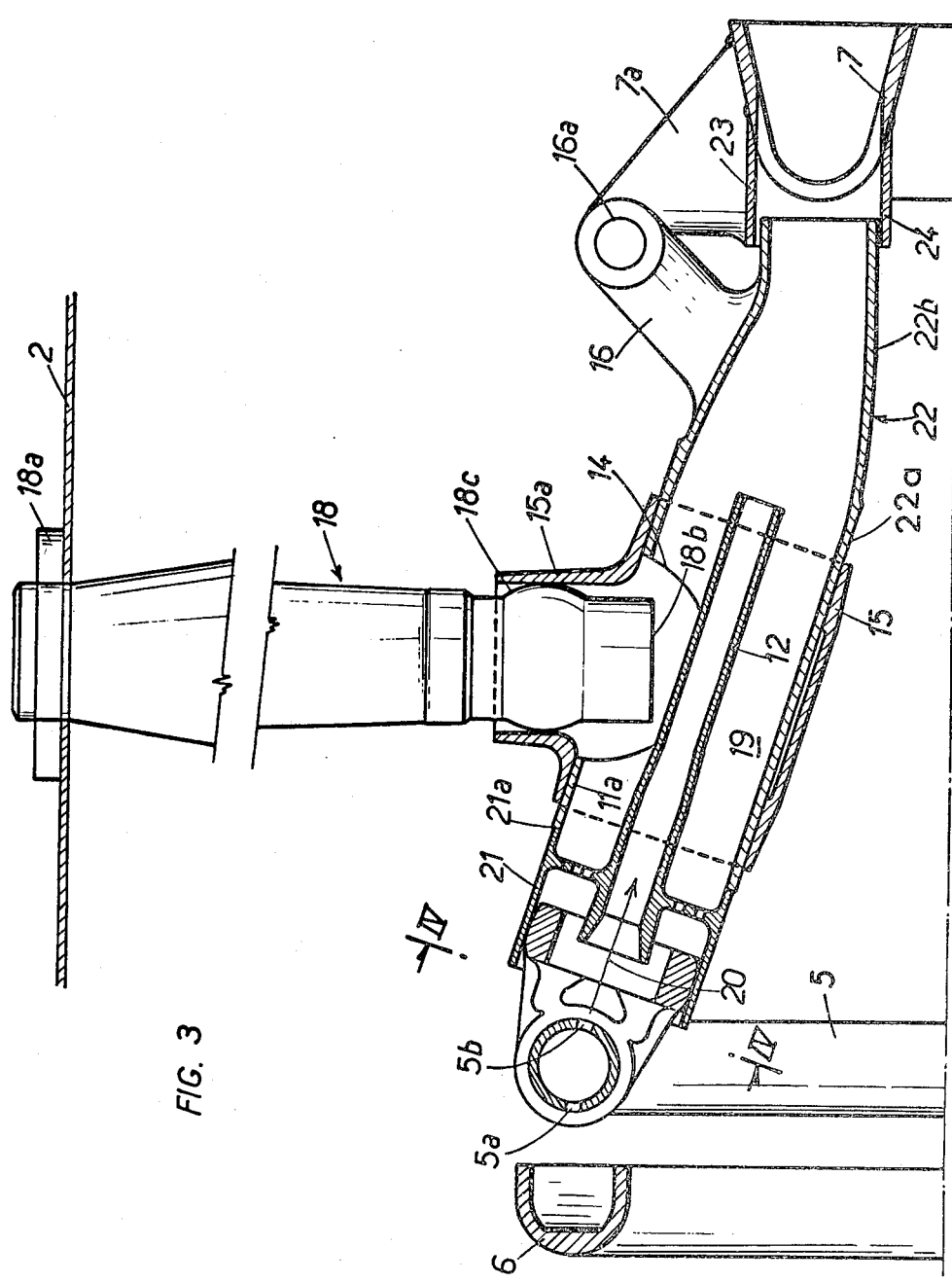
FIG. 3 shows a specific embodiment of the injection device of FIG. 2, seen in longitudinal cross section.

The ignition device shown schematically in FIGS. 1 and 2 includes a casing 11 of general tubular form, cylindrical at 11a over the great majority of its length and ending on a convergent portion 11b. A tubular conduit 12 coaxial with the cylindrical portion 11a is supported by a perforated plate 13 arranged transversely some distance downstream from the upstream end of the casing 11 and integral with the casing. The cylindrical portion 11a of the envelope is pierced, downstream of the perforated plate 13, by an opening 14 opposite which exits a pipe 15a supported by a sleeve 15 which is capable of sliding over the cylindrical portion 11a. The convergent downstream portion 11b of the casing is joined to a strap 7a integral with ring 7 by means of an arm 16 which is integral with the casing and is linked to the strap 7a by a pin 16a. The manifold 5 is provided with a pair of arms 17a, 17b which project downstream and support a ring 17 whose outer surface has the form of a partial sphere and is engaged so as to be able to slide within the cylindrical portion 11a upstream of the perforated plate 13. A spark plug 18, secured at 18a to the middle segment 2 of the afterburner channel wall, is provided near its active or open end 18b with a journal surface 18c in the shape of a partial sphere which is engaged so as to be able to slide within the pipe 15a, so that the end 18b penetrates into the chamber 19 formed by the casing 11 behind the perforated plate 13.

The adjutages 5a are dimensioned so that the fuel atomized on the anvil 6 forms, together with the air contained in the gases which flow according to the arrows F1, a carbureted mixture of such a richness as to allow the flame located farther downstream to be stabilized. A portion of this carbureted mixture is drawn through the intake opening of the upstream part 11a of the casing 11, flows through the holes of the perforated plate 13 into the chamber 19 formed inside the casing behind the plate, and is ignited within this chamber by the spark plug 18. The manifold 5 is provided on its downstream side with an aperture 5b which opens opposite the tubular conduit 12 and is dimensioned so as to issue into the latter a jet 20 having a rate of flow several times larger than the flow of fuel contained in the mixture that enters into the chamber 19 through the holes of the plate 13. The jet 20 is discharged through the tubular conduit 12 clearly downstream of the spark plug 18, where it ignites upon contact with the burning gases in the chamber 19, producing in the convergent part 11b of the casing a sort of afterburning flame which enters into a circular opening in the flame stabilizer 7 opposite the exit opening of the convergent part 11b of the casing. This flame thus ignites, in the entire afterburner channel, the reheating fuel which has been atomized on the anvil 6.

In the specific embodiment shown in more detail in FIG. 3, the casing 11 is made of two pieces, namely, one cylindrical sleeve 21 integral with the perforated plate 13, which is itself integral with the tubular conduit 12, and a body 22 comprising a cylindrical portion 22a, whose upstream edge is welded at 21a to the downstream edge of the sleeve 21, and a convergent downstream portion 22b, which is curved so as to open parallel to the axis (not shown in FIG. 3) of the afterburner channel and opposite the flame stabilizer ring 7, which according to the usual arrangement, has a smaller diameter than the injection manifold 5. Furthermore, the stabilizer ring 7 is provided with two deflectors 23, 24 which may have an appreciably curved cross section in the shape of circular arcs. These two deflectors extend upstream on either side of the exit opening of the convergent portion 22b, in such a fashion that the flame exiting the latter spreads out tangentially to the ring 7 so as to more rapidly propagate the combustion all around the ring.

The embodiment of FIG. 5, in which the components which play the same role as in the preceding figures are designated by the same reference numbers plus one hundred, shows a structure wherein the casing 111 is linked to the injection manifold 105 by a swivel joint integral with the casing. The sleeve 21 is eliminated, and the cylindrical surface 122a of the part 122 forms at its upstream end a journal surface 25 in the shape of a spherical section which is engaged in such a manner as to be capable of sliding within a sleeve 26 integral with the manifold 105. The perforated plate 113, which supports the tubular conduit 112, is integral with this sleeve 26.

In addition, in the embodiment of FIG. 5, the tubular conduit 112 is closed at 112b at its downstream end and is provided with perforations 27 through which the fuel coming from the jet 120 enters into the downstream portion 111b of the casing.

It should be noted that the described arrangements make it possible to ensure the ignition of the afterburner over a very wide range of richness and at a very large speed of flow of the gases within the channel. The adjutages 5a located in the vicinity of the aperture 5b may be made with a smaller diameter than the remaining adjutages, so that the mixture entering the chamber 19 will be leaner and can be easily ignited within this chamber by the spark plug 18. The additional fuel discharged by the tubular conduit 12 will form a considerably richer mixture at the back of this chamber 19, but this mixture will be easily ignited by the flames developed farther upstream, producing a very hot flame which will enter the stabilizer ring 7 (not shown in FIG. 5), so that the combustion will propagate through the entire channel whatever may be the richness, the Mach number and the temperature of the mixture in the flow. Such a two-stage ignition will occur in the embodiment of FIG. 5 as well as with those of FIGS. 3 and 4, since the very hot flame which exits from the chamber 19 is not produced by the speed of the jet 20 but rather by the excess fuel it discharges into the downstream portion of the chamber.

Once the afterburner is ignited, the spark plug 18 is no longer energized, so that the "prechamber" 19, which is no longer needed, does not remain constantly lit.

The described achievements evidently are but examples and may be modified, particularly by substituting equivalent industrial components, without thereby departing from the scope of the invention. In particular, the provision of several "prechambers" distributed along the circumference of the injection manifold and of the stabilizer ring would be within the scope of the invention.

We claim:

1. A device for igniting fuel injected into a rapidly flowing stream of a gaseous comburent medium wherein an enclosure with an open upstream end and a spark plug is positioned to ignite fuel in said enclosure, the improvement comprising:
   a perforated grid spanning said open upstream end;
   injecting means for injecting fuel into said stream adjacent said open upstream end whereby a carbureted mixture enters said enclosure through said grid;
   a tubular conduit extending from adjacent said upstream end, through said perforated grid to an inner end in said enclosure downstream of said spark plug; and
   said injecting means including means directing fuel into said tubular conduit.

2. A device as defined in claim 1 wherein said casing is in the afterburner channel of a turbine engine and a flame stabilizer is positioned in said stream at said discharge end of said casing;
   said injecting means comprising a fuel manifold having an opening directing fuel upstream against an anvil and a further opening directing fuel into the adjacent end of said tubular conduit.

3. A device as defined in claim 2 wherein the downstream end of said casing is secured to said flame stabilizer and its upstream end is linked to said fuel manifold by a swivel joint slidable axially of said casing;
   said spark plug being fixed relative to said afterburner channel and linked, by means of a swivel joint axially slidable along said spark plug and axially slidable on said casing.